(12) United States Patent
Berenson et al.

(10) Patent No.: US 6,356,887 B1
(45) Date of Patent: Mar. 12, 2002

(54) AUTO-PARAMETERIZATION OF DATABASE QUERIES

(75) Inventors: Harold R. Berenson, Woodinville; Peter A. Carlin, Seattle; Nigel R. Ellis; Cesar A. Galindo-Legaria, both of Redmond; Goetz Graefe, Bellevue; Ajay Kalhan, Redmond; Craig C. Peeper, Bellevue; Samuel H. Smith, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/340,596

(22) Filed: Jun. 28, 1999

(51) Int. Cl.$^7$ .............................................. G06F 17/30
(52) U.S. Cl. .............................................. 707/2; 707/4
(58) Field of Search ........................... 707/2, 3, 4, 5–6, 707/7; 717/5

(56) References Cited

U.S. PATENT DOCUMENTS

| | | | | |
|---|---|---|---|---|
| 5,822,750 A | * | 10/1998 | Jou et al. | 707/2 |
| 5,950,186 A | * | 9/1999 | Chaudhuri et al. | 707/2 |
| 6,032,143 A | * | 2/2000 | Leung et al. | 707/2 |
| 6,067,542 A | * | 5/2000 | Carino, Jr. | 707/4 |

OTHER PUBLICATIONS

Lee, et al. (IEEE publication) discloses optimizing large join queries using a graph–based approach; Dept. of Computer Science. & Inf. Eng., Taiwan, pp. 298–315, vol. 13, (2), 4–2001.*

An, N. et al. (IEEE publication) discloses selectivity estimation for spatial joins; Dept. of Computer Science, Penn. State Univ., (NSF Grant R825195–01–0); pp. 368–375, (2001).*

* cited by examiner

Primary Examiner—Diane D. Mizrahi
(74) Attorney, Agent, or Firm—Woodcock Washburn LLP

(57) ABSTRACT

An auto-parameterization process transforms a database query into a parameterized basic query form by replacing any constant values in the query with parameters. The auto-parameterization process attempts to generate a safe execution plan from the basic query form if there is currently no such plan available. A safe execution plan is defined as an execution plan that is optimal over a range of values for the parameters. If a safe execution plan can be generated, it is passed for execution, along with the constant values that were present in the query. If a safe execution plan cannot be generated, the auto-parameterization process passes a specific execution plan for execution. The safe execution plan is cached either at the time it is created or at the time it is executed. The cache is searched each time a parameterized basic query plan is generated by the auto-parameterization process. The auto-parameterization process also evaluates the query before creating the corresponding parameterized basic query form to determine if it is likely that a safe execution plan can be generated for the query.

30 Claims, 7 Drawing Sheets

AUTO-PARAMETERIZATION OF DATABASE QUERIES

FIELD OF THE INVENTION

This invention relates generally to database systems, and more particularly to auto-parameterizing queries that operate against a database.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1998, Microsoft Corporation, All Rights Reserved.

BACKGROUND OF THE INVENTION

SQL query compilation in database systems can take significant time when compared to the execution time of some simple queries. For example, the execution time to lookup a row in an index and modify some of its fields can be considerably smaller than the time it takes to parse, normalize, optimize, and prepare the corresponding SQL statement into the particular set of sub-queries that perform the required operations with the least processing cost (commonly referred to as an "execution plan"). When many simple requests are issued to a database, compilation time consumes a major portion of system resources.

A common approach to address this problem has been through the use of stored procedures. A stored procedure contains one of more SQL statements that are compiled once into their respective execution plans and stored in main memory, so they can be executed multiple times without having to be recompiled. Parameters in the stored procedure provide flexibility to this approach. For example, a stored procedure can do the database work needed to transfer money between two accounts. Such a procedure requires touching a few rows, perhaps in different tables, and it is parameterized off account numbers and amount. After the stored procedure is compiled and stored in memory, there is no need to re-compile it for later executions. Stored procedures are a standard feature in current database systems.

When applications use dynamic SQL, as opposed to stored procedures, database systems typically need to compile each statement, then execute. Many applications currently use dynamic SQL, as opposed to stored procedures, for several reasons. Some of them are legacy code; others did not want to manage the overhead of stored procedures, which are persistent objects and as such require some amount of administration. When those applications issue a large number of simple statements, compilation time can become the dominant cost factor.

Therefore, what is needed is a mechanism to detect similar queries that are issued from a number of database users so as to avoid the multiple re-compilation of such queries while not incurring the overhead of stored procedures.

SUMMARY OF THE INVENTION

The above-mentioned shortcomings, disadvantages and problems are addressed by the present invention, which will be understood by reading and studying the following specification.

An auto-parameterization process transforms a database query that is input to a database server into a parameterized basic query form by replacing any constant values in the query with parameters. The auto-parameterization process attempts to generate a safe execution plan from the basic query form if there is currently no such plan available. A safe execution plan is defined as an execution plan that is optimal over a range of values for the parameters. If a safe execution plan can be generated, it is passed to the execution stage of the database server, along with the constant values that were present in the query. If a safe execution plan cannot be generated, the auto-parameterization process passes an execution plan that contains the specific parameters to the execution stage. The safe execution plan is cached either at the time it is created or at the time it is executed. The cache is searched each time a parameterized basic query plan is generated by the auto-parameterization process.

In one aspect of the invention, the auto-parameterization process analyzes the query before creating the corresponding parameterized basic query form to determine if it is likely that a safe execution plan can be generated for the query.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular SQL database server implementation of the invention is described. Finally, in the fifth section, a conclusion of the detailed description is provided.

Hardware and Operating Environment

Figure 1:
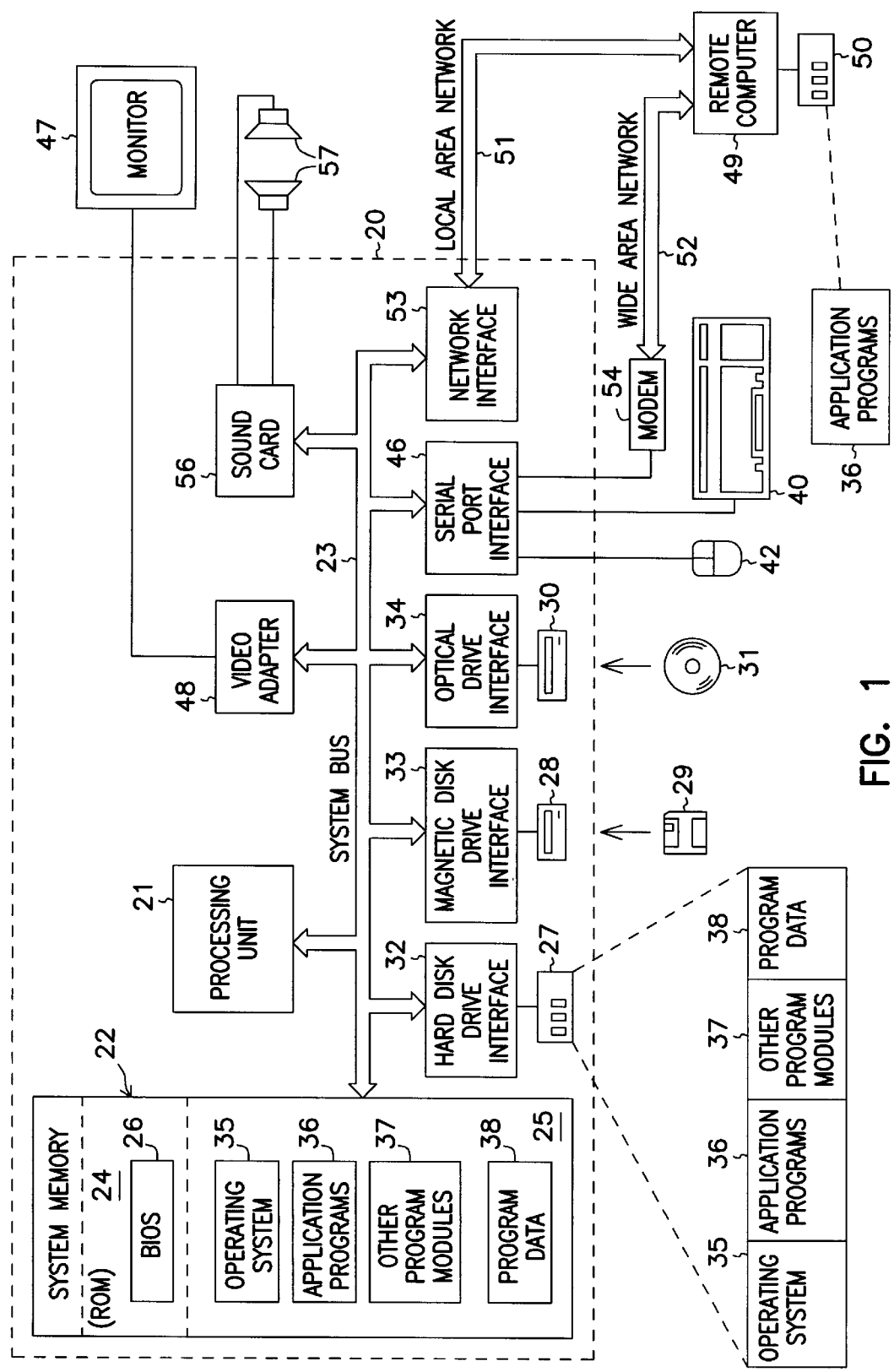
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
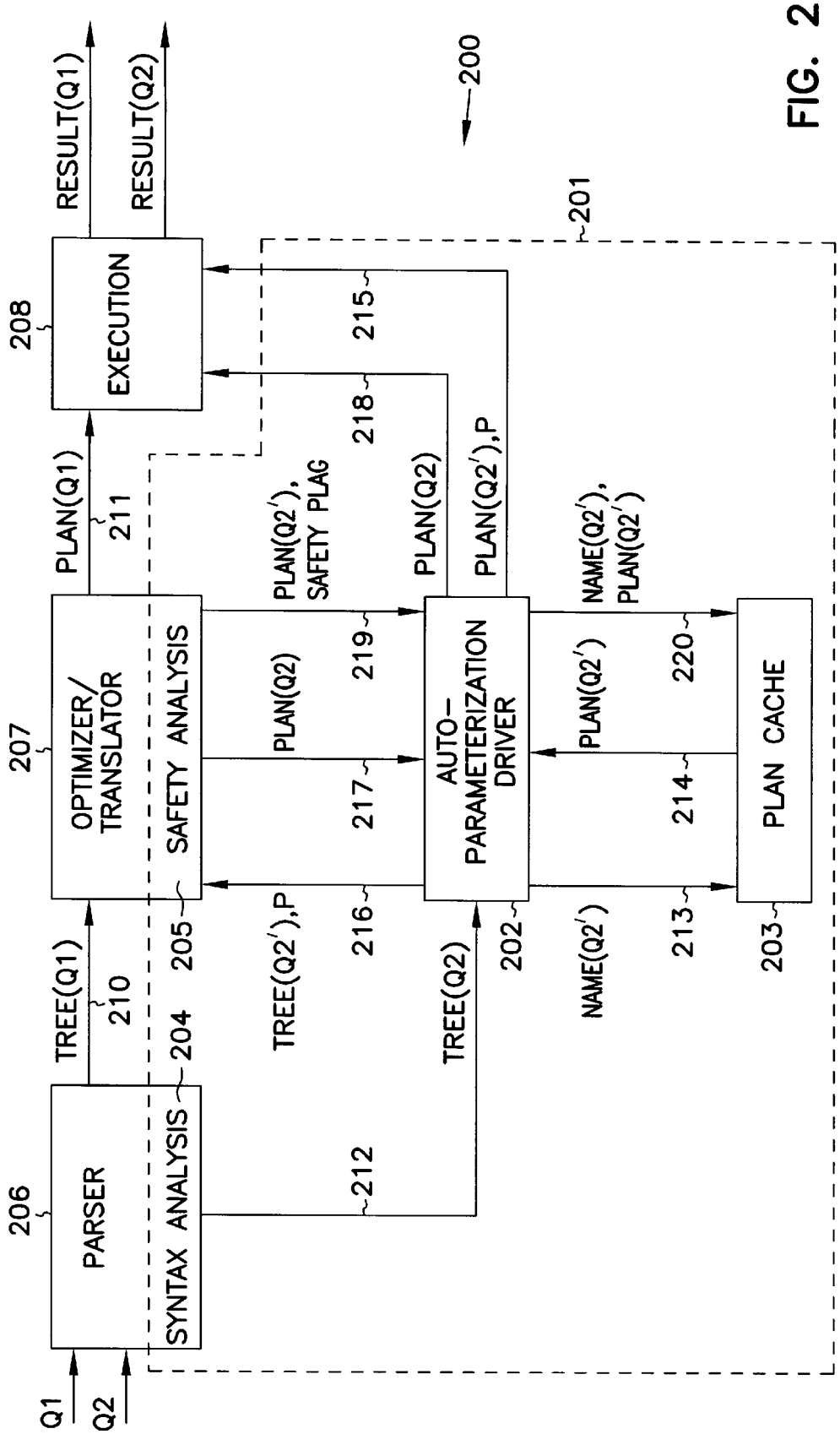
FIG. 2 is a diagram illustrating a system-level overview of an exemplary embodiment of an auto-parameterization subsystem in accordance with the invention.

A system level overview of the operation of an exemplary embodiment of the auto-parameterization of the present invention is described by reference to FIG. 2. FIG. 2 illustrates a database system 200 that incorporates an auto-parameterization subsystem 201. The database system 200 executes on a computer such as local computer 20 or remote computer 49 that is acting as a database server. The auto-parameterization subsystem 201 is made up of four components: an auto-parameterization driver 202, a plan, or procedure, cache 203, a syntax analysis module 204, and a safety analysis module 205. The database system 200 prepares and executes queries using a parser 206, an optimizer (or translation module) 207, and an execution engine 208, as is common practice in the art.

Queries can be viewed as variants of some basic form. For example, next is a basic query form, followed by a specific variant:

SELECT name FROM employees WHERE employee= @x

SELECT name FROM employees WHERE employee=5

Thus, a single execution plan for the basic query form can execute any of its variants, when values are provided to a set of parameters.

Queries Q1 and Q2 are input into the parser 206 in the normal fashion. The syntax analysis module 204 analyzes each query to determine if it is a good candidate for auto-parameterization, i.e., it is likely that a "safe" execution plan can be generated for the query as will be discussed next. In the example shown in FIG. 2, query Q1 is not considered likely to be safe and so it follows the normal preparation path as illustrated by actions 210 and 211. In an alternate embodiment not illustrated, the syntax analysis 204 is not present in the parser 206 and all queries are subjected to the safety analysis described next.

In the exemplary database system shown in FIG. 2A, Q2 is considered likely to be safe by the syntax analysis module 204, so a sequence or query tree, tree(Q2), representation of query Q2 is created by the parser 206 and sent to the auto-parameterization driver 202 (action 212). The auto-parameterization driver 202 replaces any constant values P in the query Q2 with parameters to create a parameterized basic query form Q2'. The auto-parameterization driver 202 creates a name or identifier, name(Q2'), for the basic query form Q2', and uses name(Q2') to search the plan cache 203 for an existing execution plan for the basic query form Q2' (action 213). If it exists, a matching cached execution plan, plan(Q2'), is retrieved (action 214) and passed, along with the constant values P, to the execution engine 208 for execution (action 215).

If there is no plan(Q2') in the cache 203, the auto-parameterization driver 202 passes a query tree, tree(Q2'), for the basic query form Q2' to the optimizer 207, along with the constant values P (action 216). The optimizer 207 creates an optimized execution plan for the query Q2 in its normal fashion. The safety analysis module 205 determines whether the optimized plan for query Q2 will be the optimal plan for a range of values for the parameters, i.e., it is considered "safe" for those values. The actual constant values P are used by the safety analysis module 205 as typical values for the parameters.

If the optimized plan for Q2 is deemed safe by the safety analysis module 205, the optimizer 207 returns the safe execution plan, plan(Q2'), and a safety flag to the auto-parameterization driver 202 (action 219). The safety flag causes the auto-parameterization driver 202 to store the plan(Q2') in the plan cache 203 under the unique identifier, name(Q2') (action 220). The auto-parameterization driver 202 also sends the plan(Q2') and the constant values P to the execution engine 208 for execution (action 215).

If, however, the plan(Q2') is not considered safe, the optimizer 207 generates a specific, non-parameterized execution plan, plan(Q2), for the query Q2, just as it would had query Q2 arrived through the normal preparation path 210. The plan(Q2) is passed back to the auto-parameterization driver 202 (action 217), which then submits the plan(Q2) to the execution engine 208 (action 218).

The system level overview of the operation of an exemplary embodiment of the invention has been described in this section of the detailed description. The constant values in a query are replaced with parameters to form a parameterized basic execution plan for the query. A plan cache is searched to determine if the basic execution plan exists. If the basic execution plan exists in the cache, it has been deemed the optimal execution plan for any values of the parameters and is considered safe. The parameters in the basic execution plan are replaced with the corresponding constant values and the resulting query is executed. If no matching basic execution plan is found in the cache, an attempt is made to compile a safe execution plan. If a safe execution plan can be created, it is stored in the cache. If not, a specific execution plan is executed. While the invention is not limited to any particular database system, for sake of clarity a simplified database system having a parser, an optimizer and an execution component has been described.

Methods of an Exemplary Embodiment of the Invention

In the previous section, a system level overview of the operation of an exemplary embodiment of the invention was described. In this section, the particular methods performed by a computer executing such an exemplary embodiment when acting as a database server are described by reference to a series of flowcharts. The methods to be performed by the computer constitute computer programs made up of computer-executable instructions. Describing the methods by reference to a flowchart enables one skilled in the art to develop such programs including such instructions to carry out the methods on suitable computers (the processor of the clients executing the instructions from computer-readable media). FIGS. 3A, 3B, 3C, and 3D illustrate the methods to be performed by a computer according to the exemplary embodiment of the auto-parameterization subsystem shown in FIG. 2.

Figure 3A:
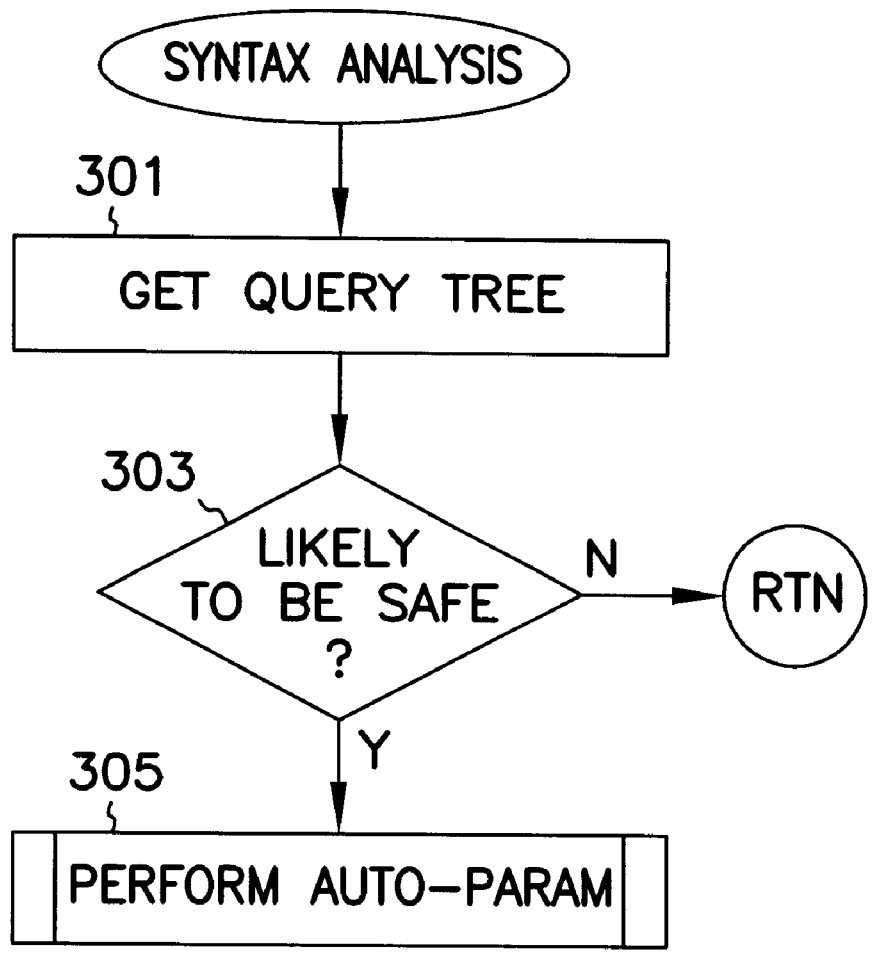
FIGS. 3A, 3B, 3C and 3D are flowcharts of methods to be performed by a computer according to an exemplary embodiment of the auto-parameterization process shown in FIG. 2.

Referring first to FIG. 3A, a flowchart illustrates the acts required to perform an exemplary embodiment of the syntax analysis described above with reference to syntax analysis module 204 in FIG. 2. A query tree for a query is obtained from a parser or a normalizer, or other such component that is standard in a database system (block 301). Syntax analysis is performed on the query tree to determine if the query is likely to be safe (block 303). Such analysis can be as simple as determining whether a "group by" clause is present in the query or as complex as evaluating what filtering conditions are to be applied to the query. A specific set of parameters for such an analysis is detailed in the next section; alternatives will be immediately apparent to one skilled in the art. If the query is not likely to be safe, the query tree is processed normally. If the query is likely to be safe, the query tree is passed to an auto-parameterization process (block 305).

Figure 3B:
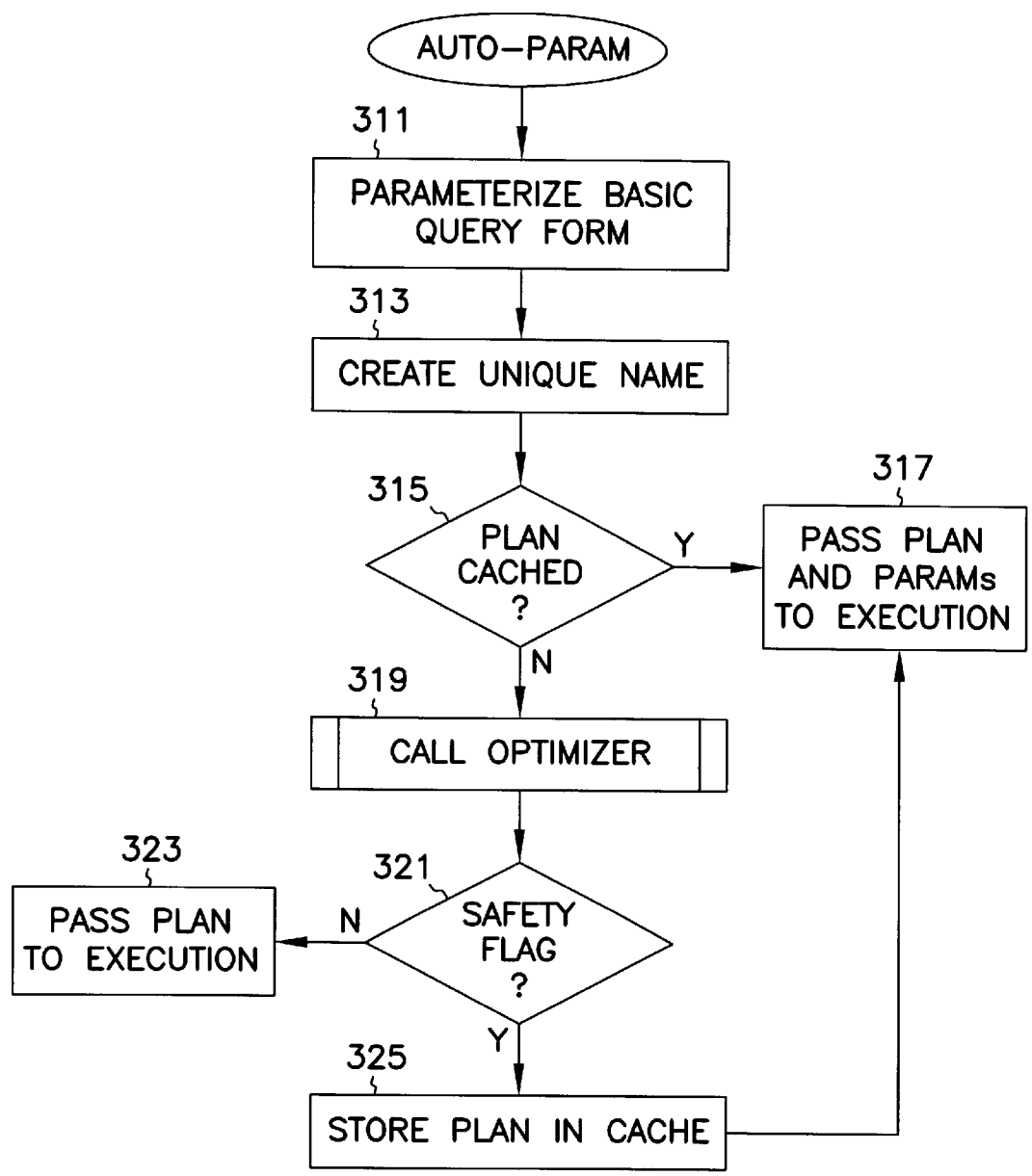

In FIG. 3B, when the auto-parameterization process receives the query tree from the syntax analysis, it separates the query tree into its basic query form and replaces all constant values by parameters (block 311). A unique identifier is created for the basic query form (block 313). The plan cache is searched using the identifier (block 315). In one exemplary embodiment, the unique identifier is a normalized form of the SQL text of the basic query form, where all redundant spaces are removed and the text is all upper case. A hash table is used to speed up the search, with hash values computed from keywords, identifiers, and parameters that compose the query. If a corresponding plan is found, it is passed to an execution process along with the values of the parameters for the query (block 317). The execution process is described in detail below in conjunction with FIG. 3D.

Figure 3C:
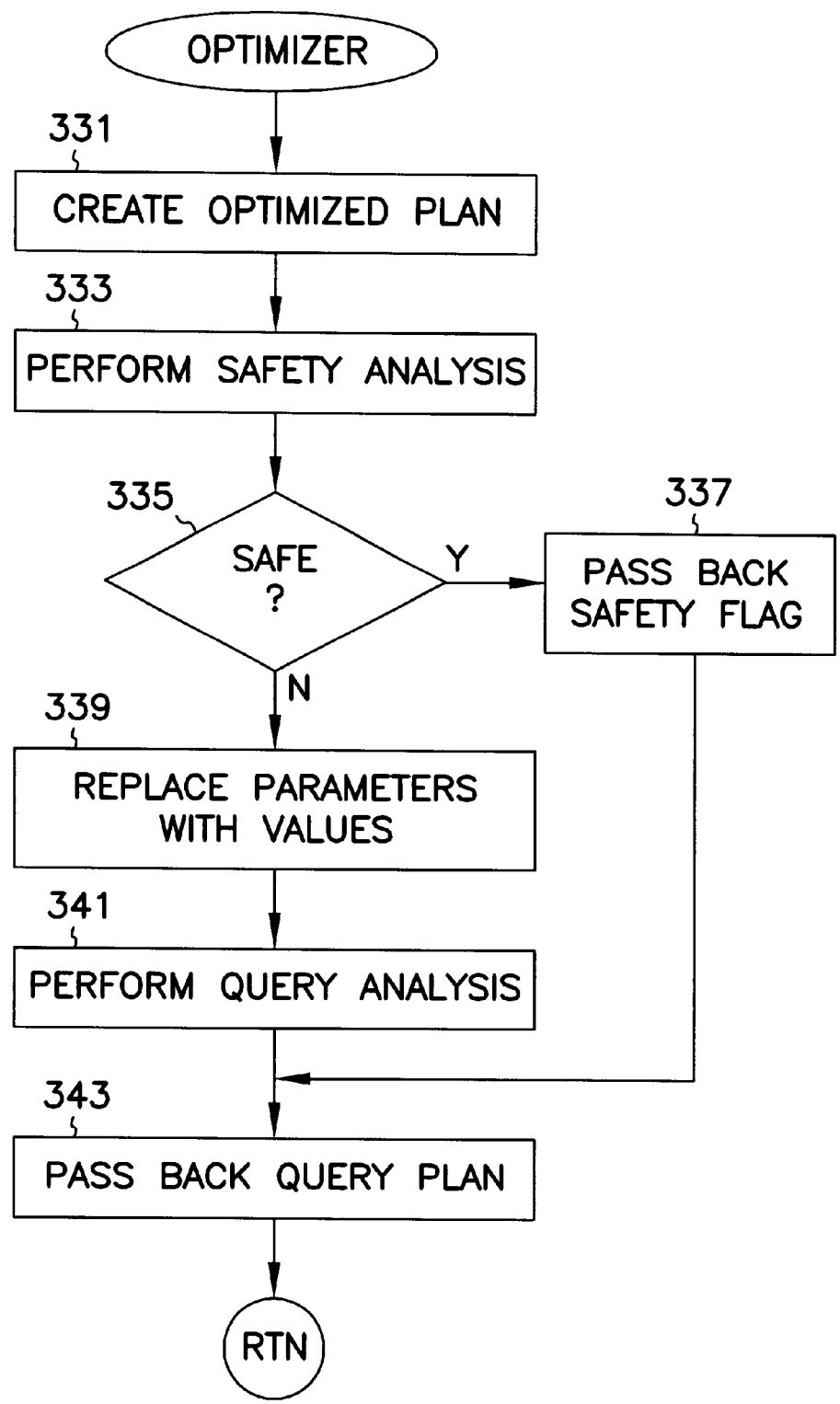

If no matching execution plan is cached, the auto-parameterization process invokes an optimization process, as discussed in detail in conjunction with FIG. 3C, to create an execution plan (block 319). The optimization process returns an execution plan. If a safety analysis process within the optimization process has determined that the execution plan is safe, the optimization process also returns a safety flag. The safety flag indicates the query is considered safe and thus is auto-parameterized. The presence of the safety flag is tested by the auto-parameterization process at block 321. If there is no safety flag, the execution plan that was created by the optimization process is specific to the query and is immediately passed to the execution process (block 323). A safe execution plan is stored in the cache under the unique query name (block 325) and is then passed to the execution process at block 317, along with the parameter values. In an alternate embodiment not illustrated, a safe execution plan is not cached until it is executed due to the possibility that changes to the schema of the underlying database can render the plan unsafe before it is executed. Examples of when changes in the database render a plan unsafe are provided further below and in the next section.

Turning now to FIG. 3C, an exemplary embodiment of a safety analysis method is described that operates in conjunction with standard optimization processing to compile queries for execution. The safety analysis method operates to perform the functions described in the previous section with reference to the safety analysis module 205 in FIG. 2. When the optimization process receives the basic query form from the auto-parameterization process, it creates an optimized plan for the basic query form (block 331). The optimization process uses the values of the parameters as hints in a well-known technique commonly referred to as "parameter sniffing." The optimized plan is then analyzed for safety (block 333). The details of the safety analysis for one exemplary embodiment is discussed next.

For single-table access, safety can be determined from the parameterized filter condition, the columns needed, and the indices available. For example, if there are no indices available, then the only available option is to read the table and apply the filter condition on each row. Such plan is optimal regardless of the filter conditions, so it is safe. A more common, but still simple case is when the filter conditions contain an equality over the key of a unique index. Then the safe, optimal strategy is to use that index and lookup up a single row.

In general, there will be various indices to choose from, and the filter conditions will not be on unique keys. Therefore, a "best" index is determined. Such best index I is covering (i.e. it contains all columns needed in the query), and there is no other index I' with condition C, such that C can be used to seek on I' but not on I. Using such an index to solve the query is safe, regardless of the value of any parameter.

When there are more alternatives, for example two filter conditions C1, C2 that can be used on different indices I1, I2, respectively, then there are several alternative execution plans available. When filter conditions contain only equalities, and columns compared have uniform, independent distributions, a plan can be considered safe.

Queries that contain multiple tables also have a number of possible execution plans. Again, safe parameterization can be done when conditions are equalities, and statistics are uniform and independent.

The execution plan for a basic form can be made more elaborate, with plan alternatives tied together by means of "switch" operators that choose between those alternatives at run-time, depending on actual parameter values to ensure the safety of the plan for different parameter values.

If the execution plan is deemed safe (block 335), a safety flag is passed back to the auto-parameterization process with the parameterized execution plan (block 337). If the execution plan is not deemed safe, the actual values are substituted for the corresponding parameters (block 339). Additional query analysis (block 341) can be performed on the resulting, non-parameterized execution plan before is returned (block 343). The additional analysis can include necessary constraint checks and interval merging, for example.

Check constraints can be used in a database to enforce particular conditions are met by the data stored in the database. When check constraints are declared in the database, they can be combined with selection predicates to infer contradictions. For example, a given table may contain only customers with an address in either CA, OR, or WA. If a query includes a condition of the form state='MA' then the check constraint indicates that the output is empty, at compile time, without having to touch the table at execution time. However, after parameterization, some compile-time contradiction detection can no longer be performed as part of the optimization process and is moved to the execution process. But when a specific execution plan is generated, the value of the parameters are known so a contradiction with check constraints can be detected.

Similarly, interval merging cannot be accomplished without actual values and is also moved into the execution process unless the execution plan is specific. For example, if a query contains conditions A>@X and A>@Y, then a single lower bound MIN@X,@Y) must be computed before the query is executed.

Figure 3D:
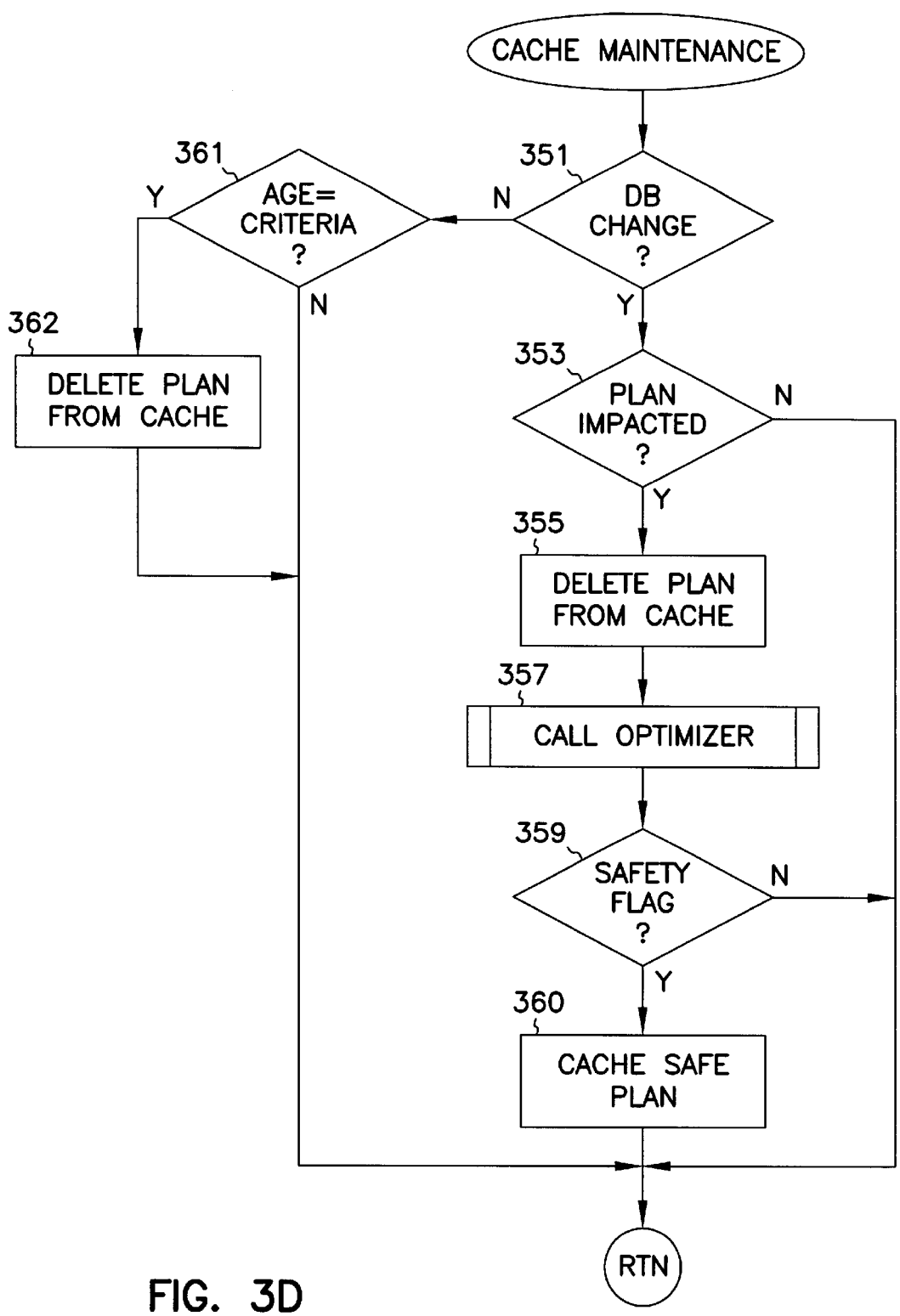

A cached safe execution plan can become unsafe due to changes in the underlying database and therefore must be deleted from the cache. Additionally, some aging process can be applied to the cached plans to delete less-used plans from the cache. FIG. 3D illustrates a method of maintaining the cache that can be invoked by the auto-parameterization process upon searching the cache or by the execution process upon executing a query so that unsafe plans can be deleted. If the underlying database is changed (block 351), the process evaluates each plan in the cache to determine if it is impacted by the change (block 353). Possible reasons for a plan being impacted include a significant change in the statistics used to derive the plan, or a change in the schema of the tables used in the query. One exemplary embodiment of the auto-parameterization process relies on database statistics collected as described in pending U.S. patent application Ser. No. 09/213087 (entitled "Automatic Database Statistics Creation") in determining the need to re-optimize a plan as described in pending U.S. patent application Ser. No. 09/212933 (entitled "Automatic Database Statistics Maintenance And Plan Regeneration"), both assigned to the assignee of the present application.

If the schema of the table has changed, the plan must be re-optimized because the compiled plan stores information about a particular version of the table. A new schema version means that the information stored in the compiled plan is now invalidated. If a plan must be recompiled, the plan is deleted from the cache (block 355). The optimization process is then invoked to see if the safety analysis can find a safe plan (block 357). If the optimization process returns a safe plan (block 359), it is cached (block 360).

FIG. 3D also illustrates one exemplary embodiment of an aging process that can be periodically invoked by a background routine, as well as by the auto-parameterization process. An age indicator associated with each plan is updated by the background routine and the auto-parameterization process. If the age indicator satisfies certain pre-determined criteria (block 361), the plan is deleted (block 362). Such criteria can be based on the "cost" of re-compiling the plan, the number of accesses to the plan, and whether the plan is being currently used. A specific embodiment of such pre-determined criteria is described in the next section. Frequently used plans have their age indicator reset so they continue to reside in the cache.

The particular methods performed by database server computer when compiling queries in accordance with an exemplary embodiment of the invention have been described. The methods performed by the computer have been shown by reference to a series of flowcharts including all the acts from 301 until 305, from 311 until 325, from 331 until 343, and from 351 until 362.

Microsoft® SQL Server Implementation

In this section of the detailed description, a particular implementation of the auto-parameterization subsystem 201 (FIG. 2) for Microsoft Corporation's SQL Server is described. In the SQL Server, the optimizer/translator module 207 of FIG. 2 comprises a normalizer and an optimizer.

Syntax and Safety Analysis

Each select, insert, update or delete query is tested to see if it fits the "simple query" (likely to be safe for auto-parameterization) test. An initial analysis is performed in the SQL Server's parser (corresponding to syntax analysis module 204 in parser 206 of FIG. 2) where the presence of certain clauses (such as GROUP BY) cause the query to fail the test. A more exhaustive test is done after the query has been normalized where it is more efficient because the query is represented in a more compact form.

The syntax of queries that can be auto-parameterized is described by AutoParameterizedQuery below. All other queries will not be auto-parameterized. Note that auto-parameterization does not always mean the parameterized query can be cached for later use because a safety analysis process operating as part of the SQL Server's Query Processor Optimizer (QPO) (corresponding to safety analysis module 205 in optimizer/translator 207 of FIG. 2) must also determine that the plan generated is "safe" for sharing across different parameter values. The decoding of the syntax is as follows: BOLDCAPS are syntax keywords, bolditalics are self-describing syntax "terminals", italics are non-terminals. Note that FixedLength TypeLiteral and Literal are the "constant" values that are parameterized.

An AutoParameterizedQuery is one of:
    INSERT table [(column [, column . . . ])] InsertSource
    DELETE table [WHERE WhereExpr]
    UPDATE table SET column=UpdateExpr [, column= UpdateExpr . . . ] [WHERE WhereExpr ]
    SELECT [correlationName=] Selectitem [, [correlationName= SelectItem . . . ] FROM table [tableCorrelationName] [WHERE WereExpr] [ORDER BY OrderByExpr [, OrderByExpr . . . ]]

An InsertSource is one of:
  DEFAULT VALUES
  VALUES (InsertExpr [, InsertExpr . . . ])
  SELECT InsertExpr [, InsertExpr . . . ]

An InsertExpr is one of (and can only contain as sub-expressions):
  Literal
  NULL
  DEFAULT
  OkBuiltinFunction ([BuiltinExpr [, BuiltinExpr . . . ]])
  OkGlobal Var
  BinaryArithmeticExpr {+|−|*|/} BinaryArithmeticExpr An UpdateExpr is one of (and can only contain as sub-expressions):
  Literal
  NULL
  DEFAULT
  OkBuiltinFunction ([BuiltinExpr [, BuiltinExpr . . . ]])
  OkGlobalVar
  BinaryArithmeticExpr {+|−|*|/} BinaryArithmeticExpr
  [tableQualifier.] column A SelectItem is one of (and can only contain as sub-expressions all but*):
  [tableQualifier.]*
  [tableQualifier.] column
  OkBuiltinFunction ([BuiltinExpr [, BuiltinExpr . . . ]])
  OkGlobal Var
  FixedLength TypeLiteral A BuiltinExpr is one of (and can only contain as sub-expressions):
  Literal
  [tableQualifier.] column A BinaryArithmeticExpr is one of (and can only contain as sub-expressions):
  Literal
  [tableQualifier.] column A WhereExpr is one of (and can only contain as sub-expressions):
  Literal
  [tableQualifier.] column
  AndExpr AND AndExpr
  CompareExpr {=|<|<=|>|>=|<>} CompareExpr An OrderByExpr is one of:
  A reference to a select-item if no
  is present in the select-list
  [tableQualifier.] column An AndExpr is one of (and can only contain as sub-expressions):
  Literal
  [tableQualifier.] column
  AndExpr AND AndExpr
  CompareExpr {=|<|<=|>|>=|<>} CompareExpr An CompareExpr is one of (and can only contain as sub-expressions):
  Literal
  [tableQualifier.] column AndExpr AND AndExpr
CompareExpr {=|<|<=|>|>=|<>} CompareExpr
A OkGlobalVar is one of:
@@datefirst
@@def_sortorder_id
@@default_langid
@@langid
@@language
@@lock_timeout
@@max_connections
@@max_precision
@@options
@@remserver
@@servername
@@servicename
@@spid
@@textsize
@@trancount
@@version
A OkBuiltinFunction is one of:
abs
acos
app_name
ascii
asin
atan
atn2
char
col_length
col_name
columnproperty
convert
cos
cot
databaseproperty
dateadd
datediff
datename
datepart
db_id
db_name
degrees
exp
file_id
file_name
filegroup_id
filegroup_name
filegroupproperty
fileproperty
floor
getdate
has_dbaccess
host_id
host_name
index_col
indexproperty
is_srvrolemember
is_userinrole
log
log10
nchar
newid
nt_client
object_id
object_name
objectproperty
odbcprec
odbcscale
parsename
permissions
pi
platform
power
program_name
quotename
radians
round
sign
sin
sqrt
square
stats_date
suser_id
suser_name
suser_sid
suser_sname
tan
typeproperty
uncompress
unicode
user_id
user_name
user_sid If the query meets the criteria given above, it is rewritten in a canonical form. That is, all keywords are in uppercase, all identifiers are quoted, standard white space rules are followed, and parameters that replace constants are numbered in ascending order starting from 1. The formal parameter list is also constructed in canonical form. For example, the query select c1 from foo where c2=5 becomes (@1 int) SELECT [c1]=[c1] FROM [foo] WHERE [c2]= @1 where @1 is the parameter.

Plan Creation and Caching

Figure 4A:
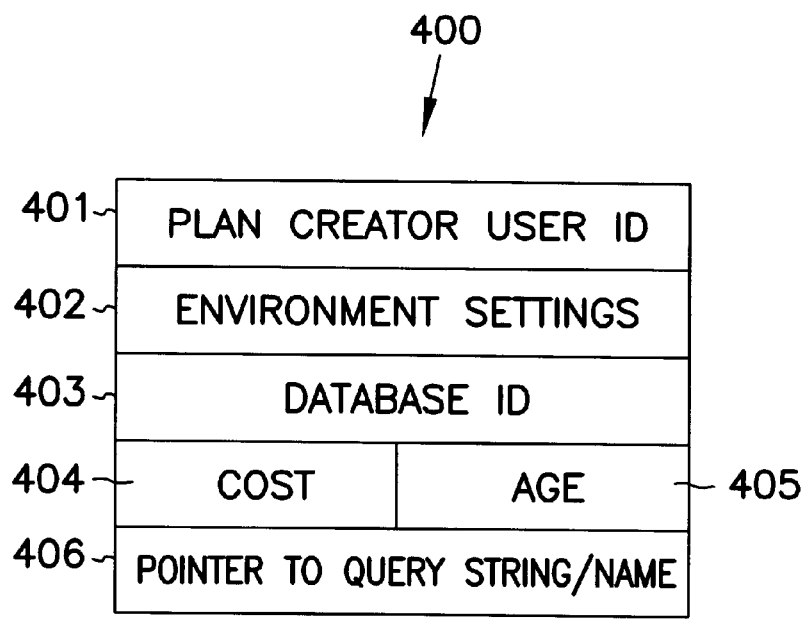
FIGS. 4A and 4B are diagrams of a query plan data structure and an execution context data structure, respectively, for use in an exemplary implementation of the invention.
Figure 4B:
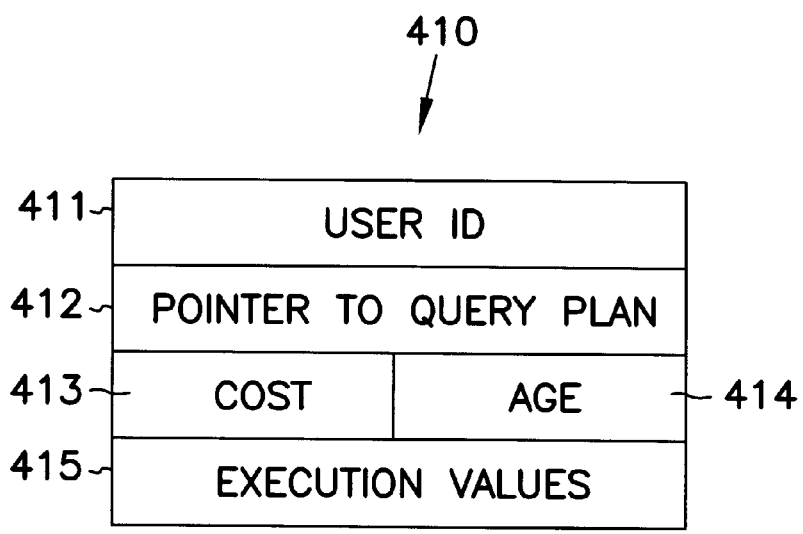

An SQL Server execution plan is made up of a query plan and an execution context. The query plan is a reentrant, read-only data structure 400 that can be used by any number of users as illustrated in FIG. 4A. Once created, multiple users are able to use the same query plan. An execution context data structure 410 as illustrated in FIG. 4B is created for each user 411 that is currently executing the query represented by a query plan data structure 400. (pointer 412) to hold data 415, such as parameter values, that are specific to that user's execution.

Cached query plans are identified by a unique name, which is a normalized version of the SQL text of the basic query form with parameters. Normalization includes converting the text to upper case, discarding all irrelevant spaces, and changing each comparison so that the parameters introduced always appear at the right hand side of comparison operators, reversing comparison operators when needed. The goal of normalization is to detect the same basic form in queries whose syntactic differences are not semantically relevant, such as the use of space characters. The resulting string is used both as the query string as well as the unique query name and is stored in the cache. A pointer 406 to the query name/string in the cache is stored in the query plan data structure 400.

The plan cache is implemented in SQL Server using a hash table. The hash function is generated from the query name/string using an algorithm that is known to yield low collisions. Multiple variants of suitable hashing algorithms are well known and can be readily substituted as will be immediately apparent to one skilled in the art. The following keys are used to verify a match in addition to the query name/string:

plan creator's userid 401: when set to a special value it indicates that the query plan is usable by all users in the database, otherwise it is only available for use by the creator. This key is used if the query does not rely on implicit name resolution;

environment settings 402: these affect compile and have to be matched with the user's environment so that the user gets the expected behavior. Different settings result in different query plans, all of which co-exist in the same hash bucket; and database id 403: the database id affects the resolution of table names when multiple tables with the same name exists in different databases.

If the cache lookup for a compiled query plan fails, QPO is invoked to generate an execution plan. The constants that were converted to parameters are passed in as a "typical values" hint to QPO to enable parameter sniffing, as used for stored procedures. If QPO generates a safe execution plan it is cached at the end of the compile. An unsafe execution plan cannot be shared and to avoid destroying it, and wasting the work done so far, the unsafe execution plan is attached to the compile context of the containing statement. Such an unsafe execution plan will only be reused if an identical statement is received.

Cache Maintenance

As described in the previous section, certain changes in a database can cause an execution plan to be considered unsafe. SQL Server marks a cached execution plan for a query as unsafe under the following conditions:

Any structural (schema) changes made to a table or view referenced by the query (ALTER TABLE and ALTER VIEW).

New distribution statistics being generated either explicitly from a statement such as UPDATE STATISTICS or automatically.

Dropping an index used by the execution plan.

An explicit call to recompile the query (WITH RECOMPILE or sp_recompile).

Large numbers of changes to keys, INSERT or DELETE statements for a table referenced by the query.

For tables with triggers, if the number of rows in the inserted or deleted tables grows significantly.

Also as described previously, SQL Server performs an aging process on cached plans. Each query plan and execution context has an associated cost factor 404, 413 that indicates how expensive the corresponding data structure is to compile. These data structures also have an age field 405, 414. Each time the data structure is referenced by a connection, the age field is incremented by the compilation cost factor. For example, if a query plan has a cost factor of 8 and is referenced twice, its age becomes 16. A lazywriter process periodically scans the list of data structures in the plan cache. On each scan, the lazywriter decrements the age field for each data structure by 1. Thus, the age of the present sample query plan is decremented to 0 after 16 scans of the plan cache, unless another user references the plan.

The lazywriter process deallocates a data structure if the following criteria are met:

The memory manager needs memory and all available memory is currently used;

The age field for the data structure is 0; and

The data structure is not currently being referenced.

Because the age field is incremented each time a data structure is referenced, frequently referenced data structures do not have their age fields decremented to 0 and are not aged from the cache. Data structures that are infrequently referenced are soon eligible for deallocation, but are not actually deallocated unless memory is needed for other data structures.

The specific syntax and safety analysis employed by the SQL Server in implementing the auto-parameterization process has been described in this section. In addition, the data structures that comprise an execution plan, and the cache search methodology have also been discussed. Finally, necessary maintenance for the cache has been disclosed.

Conclusion

An auto-parameterization process for use within a database server has been described that transforms a database query into a parameterized basic query form and attempts to create a safe execution plan from the basic query form, i.e., an execution plan that is optimal over a range of values for the parameters. A safe execution plan is cached for reuse. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that the processes of the auto-parameterization can be performed in other components of the database server than those shown in the exemplary embodiments of the present application. Furthermore, those of ordinary skill within the art will appreciate that the criteria used to determine the safety of an execution plan is dependent upon the underlying database management system.

The terminology used in this application with respect to SQL relational databases is meant to include all database environments that compute execution plans for database queries. Therefore, it is manifestly intended that this invention be limited only by the following claims and equivalents thereof.

We claim:

1. A computerized method for automatically parameterizng a database query comprising:

creating a basic query form by an auto-parameterization system for the query by replacing any constant values with parameters;

attempting to create a safe execution plan for the basic query form if no safe execution plan by an auto-parameterization system currently exists; and passing the safe execution plan and the constant values by an auto-parameterization system onto execution if the safe execution plan exists.

2. The method of claim 1, further comprising:

determining if the query is likely to have a safe execution plan; and creating the basic query form if the query is determined to likely to have a safe execution plan.

3. The method of claim 1, wherein determining if the query is likely to have a safe execution plan comprises:

performing syntax analysis on the query.

4. The method of claim 1, comprising:

creating a unique name for the basic query form; and storing the safe execution plan in a cache under the unique name.

5. The method of claim 4, wherein the safe execution plan is stored in the cache when it is created.

6. The method of claim 4, wherein the safe execution plan is stored in the cache when it is executed.

7. The method of claim 4, wherein the unique name is based on elements in the basic query form.

8. The method of claim 4, further comprising:

determining if a current safe execution plan exists by searching the cache using the unique name for the basic query form.

9. The method of claim 4, further comprising:

searching the cache using the unique name for the basic query form before executing the safe execution plan; and creating a specific execution plan if the safe execution plan does not exist in the cache.

10. The method of claim 4, further comprising:

removing the safe execution plan from the cache when it is no longer optimal over a range of values for the parameters.

11. The method of claim 4, further comprising:

removing the safe execution plan from the cache when an age indicator associated with the safe execution plan satisfied pre-determined criteria.

12. The method of claim 1, wherein attempting to create the safe execution plan comprises:

generating an optimal execution plan for the basic query form;

analyzing the optimal execution plan against a range of values for the parameters; and designating the optimal execution plan as the safe execution plan if the evaluation shows it is optimal over the range of values.

13. The method of claim 12, wherein the range of values is based on the constant values in the query.

14. The method of claim 1, wherein the execution plan comprises:

a query plan; and an execution context.

15. The method of claim 1, wherein the elements are performed in the order recited.

16. The method of claim 1, further comprising passing a specific execution plan onto execution if the safe execution plan does not exist.

17. A computer-readable medium having computer-executable modules stored thereon, the modules comprising:

a syntax analysis module that determines if query is likely to generate a safe execution plan;

an auto-parameterization driver module that creates a parameterized basic query form from the query and further passes any safe execution plan generated from the parameterized basic query form onto an execution module; and a safety analysis module that evaluates whether the execution plan generated from the parameterized basic query form is safe.

18. The computer-readable medium of claim 17, further comprising:

a parser module that parses the query into a query tree, submits the query tree to the syntax analysis module for analysis, and further submits the query tree to an optimizer module if the query is not likely to generate a safe execution plan.

19. The computer-readable medium of claim 17, further comprising:

a parser module that parses the query into a query tree, submits the query tree to the syntax analysis module for analysis, and further submits the query tree to a normalizer module if the query is not likely to generate a safe execution plan.

20. The computer-readable medium of claim 19, wherein the normalizer module normalizes the query tree and submits the normalized query tree to the syntax analysis module for analysis, and further submits the query tree to an optimizer module if the query is not likely to generate a safe execution plan.

21. The computer-readable medium of claim 17, further comprising;

an optimizer module that generates the execution plan from the parameterized basic query form.

22. The computer-readable medium of claim 21, wherein the optimizer module generates a specific execution plan for the query if the safety analysis module evaluates the execution plan generated from the parameterized basic query form as unsafe, and wherein the auto-parameterization driver module submits the specific execution plan to the execution module.

23. The computer-readable medium of claim 17, wherein the safety analysis module evaluates the execution plan as safe if the execution plan is optimal over a range of parameter values.

24. The computer-readable medium of claim 17, wherein the auto-parameterization driver module stores any safe execution plan generated from the parameterized basic query form in a cache and searches the cache for the safe execution plan each time it creates the same parameterized basic query form.

25. The computer-readable medium of claim 24, further comprising an execution module that searches the cache for the safe execution plan when it receives the safe execution plan from the auto-parameterization driver module, and further causes a specific execution plan for the query to be generated when the safe execution plan is not found in the cache.

26. The computer-readable medium of claim 17, further comprising an execution module that stores the safe execution plan in a cache when the plan is executed and wherein the auto-parameterization driver searches the cache for the safe execution plan each time it creates the same parameterized basic query form.

27. A computerized system comprising:

a processing unit;

a system memory coupled to the processing unit through a system bus;

a computer-readable medium coupled to the processing unit through a system bus; and an auto-parameterization sub-system executed from the computer-readable medium by the processing unit, wherein the auto-parameterization subsystem causes the processing unit to generate a parameterized basic query form from a query, to generate an execution plan from the parameterized basic query form, to evaluate the execution plan for safety, and to submit the execution plan for execution if it is evaluated as safe.

28. The computerized system of claim 27, wherein the auto-parameterization subsystem further causes the processing unit to store the execution plan in the system memory if it is evaluated as safe, and to search the system memory for the execution each time the processing unit generates the parameterized basic query form.

29. The computerized system of claim 28, wherein the auto-parameterized subsystem causes the processing unit to remove the execution plan from the system memory under certain conditions.

30. The computerized system of claim 29, wherein the certain conditions are selected from the group consisting of:
    alteration to a schema structure accessed by the query;
    modification of statistics used to generate the execution plan; and
    satisfaction of pre-determined criteria by an age indicator associated with the execution plan.

* * * * *

UNITED STATES PATENT AND TRADEMARK OFFICE
CERTIFICATE OF CORRECTION

PATENT NO.    : 6,356,887 B1
DATED         : March 12, 2002
INVENTOR(S)   : Berenson et al.

It is certified that error appears in the above-identified patent and that said Letters Patent is hereby corrected as shown below:

<u>Title page,</u>
Illustrative Figure, reference number 219, "PLAG" should read -- FLAG --.

<u>Drawings,</u>
Fig. 2, refrence number 219, "PLAG" should read -- FLAG --.

<u>Column 3,</u>
Line 40, "include" should read -- including --.

<u>Column 5,</u>
Lines 23 and 25, "employee=" (both occurrences) should read -- employeeid --.

<u>Column 8,</u>
Line 22, insert -- the plan -- after the word "before".
Line 46, "MIN@X,@Y)" should read -- MIN(@X, @Y) --.

<u>Columns 9 through 12,</u>
(Should appear as follows including bolding, bullets and italics)

An *AutoParameterized Query* is on of:
- INSERT *table* [ ( *column* [, *column* . . . ] ) ) *InsertSource*
- DELETE *table* [ WHERE *WhereExpr* ]
- UPDATE *table* SET *column* = *UpdateExpr* [, *column* = *UpdateExpr* . . . ]
  [ WHERE *WhereExpr* ]
- SELECT [ *correlationName* = ] *SelectItem* [, [ *correlationName* = ] *SelectItem* . . .]
  FROM *table* [ *tableCorrelationName* ] [WHERE *WhereExpr*] [ ORDER BY
  *OrderByExpr* [, *OrderByExpr* . . .] ]

UNITED STATES PATENT AND TRADEMARK OFFICE
CERTIFICATE OF CORRECTION

PATENT NO.   : 6,356,887 B1
DATED        : March 12, 2002
INVENTOR(S)  : Berenson et al.

It is certified that error appears in the above-identified patent and that said Letters Patent is hereby corrected as shown below:

An *InsertSource* is one of:
- DEFAULT VALUES
- VALUES ( *InsertExpr* [, *InsertExpr* . . .] )
- SELECT ( *InsertExpr* [, *InsertExpr* . . .] )

An *InsertExpr* is one of (and can only contain as sub-expressions):
- *Literal*
- NULL
- DEFAULT
- *OkBuiltinFunction* ( [ *BuiltinExpr* [, *BuiltinExpr* . . .] ] )
- *OkGlobalVar*
- *BinaryArithmeticExpr* { + | - | * | / } *BinaryArithmeticExpr*

An *UpdateExpr* is one of (and can only contain as sub-expressions):
- *Literal*
- NULL
- DEFAULT
- *OkBuiltinFunction* ( [ *BuiltinExpr* [, *BuiltinExpr* . . . ] ] )
- *OkGlobalVar*
- *BinaryArithmeticExpr* { + | - | * | / } *BinaryArithmeticExpr*

- [ *tableQualifier .* ] *column*

A *SelectItem* is one of (and can only contain as sub-expressions all but *):
- [ *tableQualifier .* ] *
- [ *tableQualifier .* ] *column*
- *OkBuiltinFunction* ( [ *BuiltinExpr* [, *BuiltinExpr* . . . ] ] )
- *OkGlobalVar*
- *FixedLength TypeLiteral*

A *BuiltinExpr* is one of (and can only contain as sub-expressions):
- *Literal*
- [*tableQualifier .* ] *column*

A *BinaryArithmeticExpr* is one of (and can only contain as sub-expressions):
- *Literal*
- [*tableQualifier .* ] *column*

A *WhereExpr* is one of (and can only contain as sub-expressions):
- *Literal*
- [ *tableQualifier .*] *column*
- *AndExpr* AND *AndExpr*

UNITED STATES PATENT AND TRADEMARK OFFICE
CERTIFICATE OF CORRECTION

PATENT NO.    : 6,356,887 B1
DATED         : March 12, 2002
INVENTOR(S)   : Berenson et al.

It is certified that error appears in the above-identified patent and that said Letters Patent is hereby corrected as shown below:

- *CompareExpr* { = | < | <= | > | >= | <> } *CompareExpr*

An *OrderByExpr* is one of:
- A reference to a select-item if no * is present in the select-list
- [ *tableQualifier* . ] *column*

An *AndExpr* is one of (and can only contain as sub-expressions):
- *Literal*
- [ *tableQualifier* . ] *column*
- *AndExpr* AND *AndExpr*
- *CompareExpr* { = | < | <= | > | >= | <> } *CompareExpr*

An *CompareExpr* is one of (and can only contain as sub-expressions):
- *Literal*
- [ *tableQualifier* . ] *column*
- *AndExpr* AND *AndExpr*
- *CompareExpr* { = | < | <= | > | >= | <> } *CompareExpr*

A *OkGlobalVar* is one of:
- @@datefirst

- @@def_sortorder_id
- @@default_langid
- @@langid
- @@language
- @@lock_timeout
- @@max_connections
- @@max_precision
- @@options
- @@remserver
- @@servername
- @@servicename
- @@spid
- @@textsize
- @@trancount
- @@version

A *OkBuiltinFunction* is one of:
- abs
- acos
- app_name

UNITED STATES PATENT AND TRADEMARK OFFICE
CERTIFICATE OF CORRECTION

PATENT NO. : 6,356,887 B1
DATED : March 12, 2002
INVENTOR(S) : Berenson et al.

It is certified that error appears in the above-identified patent and that said Letters Patent is hereby corrected as shown below:

- ascii
- asin
- atan
- atn2
- char
- col_length
- col_name
- columnproperty
- convert
- cos
- cot
- databaseproperty
- dateadd
- datediff
- datename
- datepart
- db_id
- db_name
- degrees
- exp
- file_id

- file_name
- filegroup_id
- filegroup_name
- filegroupproperty
- fileproperty
- floor
- getdate
- has_dbaccess
- host_id
- host_name
- index_col
- indexproperty
- is_srvrolemember
- is_serinrole
- log
- log10
- nchar
- newid
- nt_client
- object_id
- object_name
- objectproperty

UNITED STATES PATENT AND TRADEMARK OFFICE
CERTIFICATE OF CORRECTION

PATENT NO.      : 6,356,887 B1
DATED           : March 12, 2002
INVENTOR(S)     : Berenson et al.

It is certified that error appears in the above-identified patent and that said Letters Patent is hereby corrected as shown below:

- odbcprec
- odbescale
- parsename
- permissions
- pi
- platform
- power
- program_name
- quotename
- radians
- round
- sign
- sin
- sqrt
- square
- stats_date
- suser_id
- suser_name
- suser_sid
- suser_sname
- tan
- typeproperty
- uncompress
- unicode
- user_id
- user_name
- user_sid

UNITED STATES PATENT AND TRADEMARK OFFICE
CERTIFICATE OF CORRECTION

PATENT NO.   : 6,356,887 B1
DATED        : March 12, 2002
INVENTOR(S)  : Berenson et al.

It is certified that error appears in the above-identified patent and that said Letters Patent is hereby corrected as shown below:

Column 10,
Line 2 "[correlationName=" should read -- [correlationName=] --
Line 54, insert -- * -- after "no".

Column 12,
Line 63, delete "[(pointer 412) to hold data 415, such as parameter values, that are specific to that user's execution.]" and insert -- A query plan data structure 400 in one embodiment includes a plan creator used id 401, environment settings 402, database id 403, cost 404, age 405, and pointer 412 to query string/name 406. An execution context data structure 410 in one embodiment includes a user id 411, pointer to query plan 412, cost 413, age 414 and execution values 415, to hold data such as parameter values that are specific to that user's execution -- after "structure 400."

Signed and Sealed this

Eighteenth Day of February, 2003

JAMES E. ROGAN
*Director of the United States Patent and Trademark Office*